US008774778B2

(12) United States Patent
Faillaci et al.

(10) Patent No.: US 8,774,778 B2
(45) Date of Patent: Jul. 8, 2014

(54) MOBILE LOCATION IDENTIFIER FOR SOCIAL CHECK-IN APPLICATIONS

(75) Inventors: Anthony E. Faillaci, Austin, TX (US); Matthew Charles Hillary, Tyler, TX (US); Jorge Rafael Nogueras, Austin, TX (US); Irina Tyshkevich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 13/425,791

(22) Filed: Mar. 21, 2012

(65) Prior Publication Data

US 2013/0252594 A1    Sep. 26, 2013

(51) Int. Cl.
*H04M 3/42* (2006.01)
*H04M 11/04* (2006.01)
*H04W 24/00* (2009.01)

(52) U.S. Cl.
USPC .................. 455/414.2; 455/414.1; 455/404.2; 455/457

(58) Field of Classification Search
USPC .................. 455/414.2, 414.1, 404.2, 457
See application file for complete search history.

(56) References Cited

U.S. PATENT DOCUMENTS

| 7,096,030 B2 | 8/2006 | Huomo | 455/456.3 |
| 2005/0038876 A1 | 2/2005 | Chaudhuri | 709/219 |
| 2007/0030824 A1 | 2/2007 | Ribaudo et al. | 370/328 |
| 2007/0162550 A1 | 7/2007 | Rosenberg | 709/206 |
| 2008/0234929 A1 | 9/2008 | Watson et al. | 701/207 |
| 2009/0216446 A1 | 8/2009 | Ma et al. | 701/213 |
| 2009/0233629 A1 | 9/2009 | Jayanthi | 455/457 |
| 2009/0235176 A1 | 9/2009 | Jayanthi | 715/738 |
| 2010/0004005 A1 | 1/2010 | Pereira et al. | 455/457 |
| 2010/0148954 A1 | 6/2010 | Bobier | 340/539.11 |
| 2010/0151887 A1 | 6/2010 | Bobier | 455/457 |
| 2011/0045842 A1 | 2/2011 | Rork et al. | 455/456.1 |
| 2012/0252418 A1* | 10/2012 | Kandekar et al. | 455/414.1 |
| 2013/0166385 A1* | 6/2013 | Russell | 705/14.58 |

OTHER PUBLICATIONS

Miluzzo et al., "Sensing Meets Mobile Social Networks: The Design, Implementation and Evaluation of the CenceMe Application," SenSys '08 Proceedings of the 6th ACM conference on Embedded network sensor systems, ACM, New York, NY, Nov. 2008, pp. 337-350.

* cited by examiner

*Primary Examiner* — Omoniyi Obayanju
(74) *Attorney, Agent, or Firm* — VanLeeuwen & VanLeeuwen; Diana R. Gerhardt (57) ABSTRACT

An approach is provided that receives a geographic beacon location that corresponds to a mobile entity with the mobile entity being an established entity at a social network website. A geographic user location is received with the geographic user location corresponding to a mobile user device that is associated with a user of the social networking website. A determination is made as to whether the geographic beacon location is proximate to the geographic user location. A check-in of the user at the entity is logged at the social media website in response to the geographic beacon location being proximate to the geographic user location.

24 Claims, 10 Drawing Sheets

MOBILE LOCATION IDENTIFIER FOR SOCIAL CHECK-IN APPLICATIONS

TECHNICAL FIELD

The present disclosure relates to mobile location beacons. More particularly, the present disclosure relates to proximity check-in functionality when a user is near a mobile location beacon.

BACKGROUND OF THE INVENTION

Many social network websites allow users to "check in" at various physical establishments, such as at a store, entertainment venue, or the like. The current check-in technology allows check-in at physical locations based upon a physical address (e.g., street address, etc.) or a fixed GPS coordinate. Using check-in technology, users can check in to a specific location by text messaging or by using a mobile application on a smartphone. The smartphone application typically uses the location of the phone (using triangulation, GPS, etc.) to identify the current location of the user. The user's current location is then matched against physical locations, such as businesses, venues, etc., that have registered their physical locations with the social network website. When a match is found, the social media website is able to report that the user has "checked into" a particular physical establishment. One approach that is used by many applications is to provide a list of "places" that displays a list of nearby places to the user. If the user's desired place is on the list, the user simply selects the appropriate place from the list. However, if a location is not on the nearby places list, the user can add the location directly from the phone. Once a user has checked in, they have the option of sharing their location with friends in one or more social network websites. The social network website typically shares the information with other users by posting a comment or other text that is visible to other users.

SUMMARY

According to one embodiment of the present invention, an approach is provided that receives a geographic beacon location that corresponds to a mobile entity with the mobile entity being an established entity at a social network website. A geographic user location is received with the geographic user location corresponding to a mobile user device that is associated with a user of the social networking website. A determination is made as to whether the geographic beacon location is proximate to the geographic user location. A check-in of the user at the entity is logged at the social media website in response to the geographic beacon location being proximate to the geographic user location.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
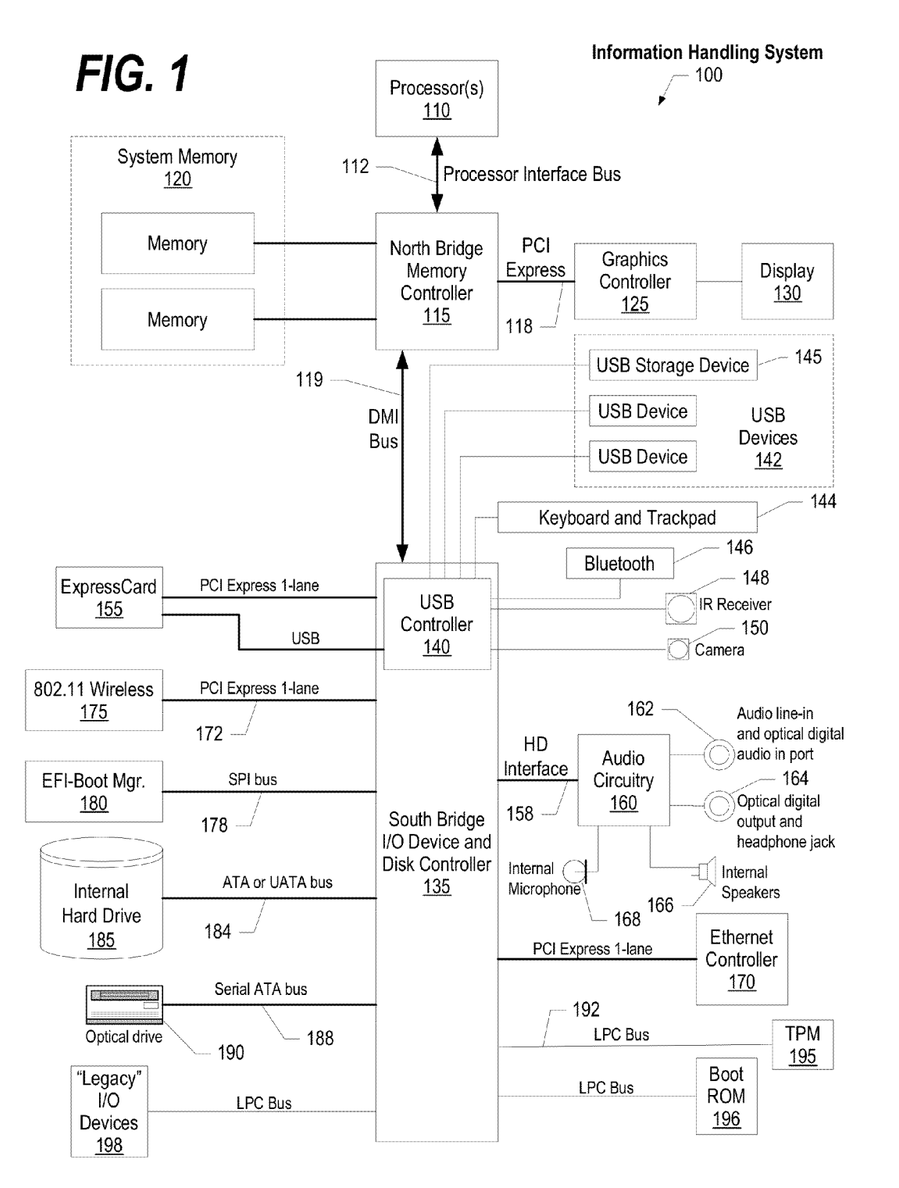
FIG. 1 is a block diagram of a data processing system in which the methods described herein can be implemented.
Figure 2:
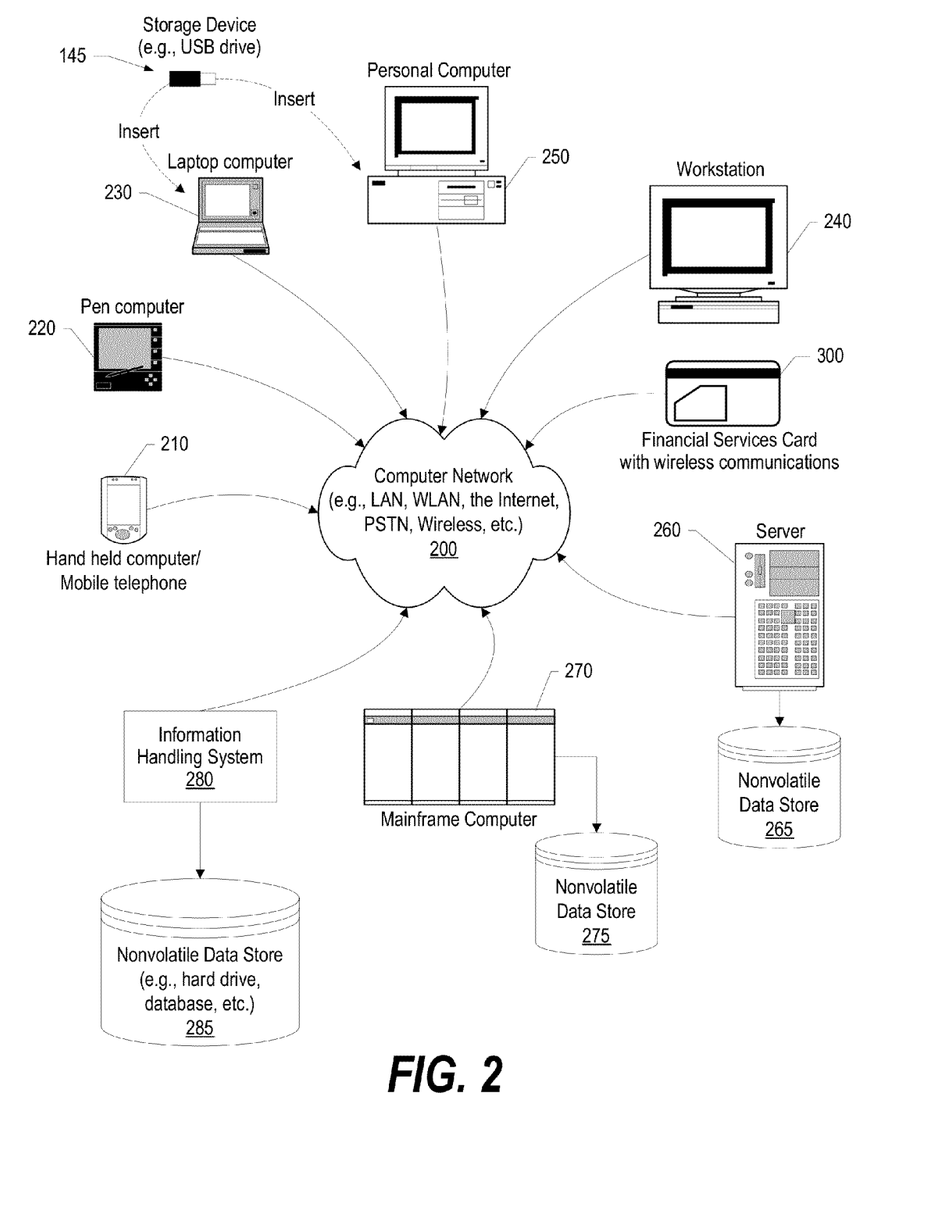
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH).

Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a FireWire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
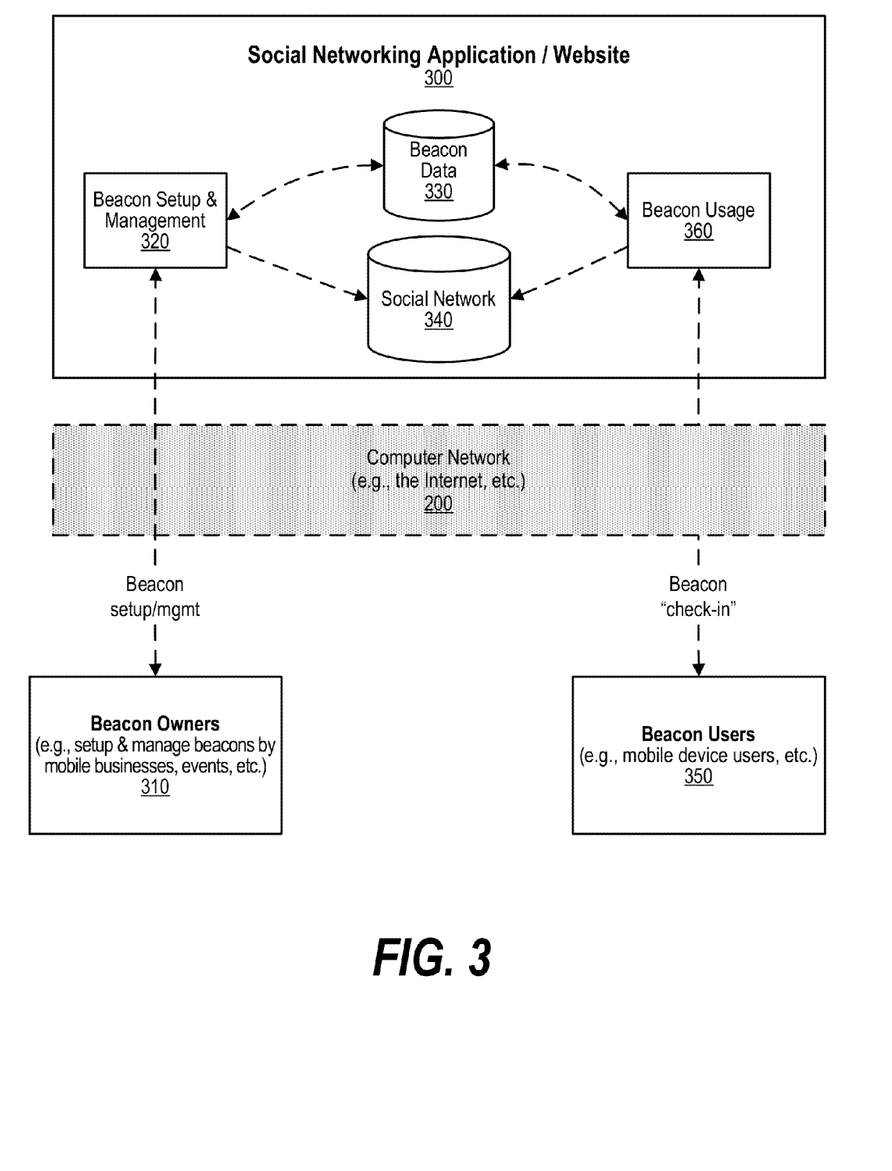
FIG. 3 is a block diagram depicting setup, management, and usage of a mobile location beacon.

FIG. 3 is a block diagram depicting setup, management, and usage of a mobile location beacon. Social network website 300 includes processes and data stores directed at mobile entity management. Beacon setup and management process 320 establishes mobile entities for beacon owners 310 and provides for management of the mobile entities. Social network website stores beacon data associated with mobile entities in beacon data store 330. As shown, mobile entities are associated with businesses, events, organizations, and any other type of entity that desires a mobile location that can be visited by users. Owners of mobile entities (310) communicate with social network website 300 using computer network 200, such as the Internet.

Beacon usage process 360 provides mobile entity usage functionality to social network website users 350. In particular, the social network website users are mobile users of the social network website that utilizes mobile devices such as smartphones, etc. to check-in to both traditional (fixed) and mobile entities. Users (350) wirelessly communicate with social network website 300 using computer network 200, such as the Internet. Social network website 300 maintains records of check-ins at mobile entities in social network data store 340. Other users of social network website 300 can then view the check-in records to see the activities and locations of friends and colleagues. The specific users that are able to view another user's data [[is]] are determined by the access or security policy in place at the social network website. For example, in many systems, the users need to be associated with one another on the social network website (e.g., "friends", etc.) in order to view such check-in records.

Figure 4:
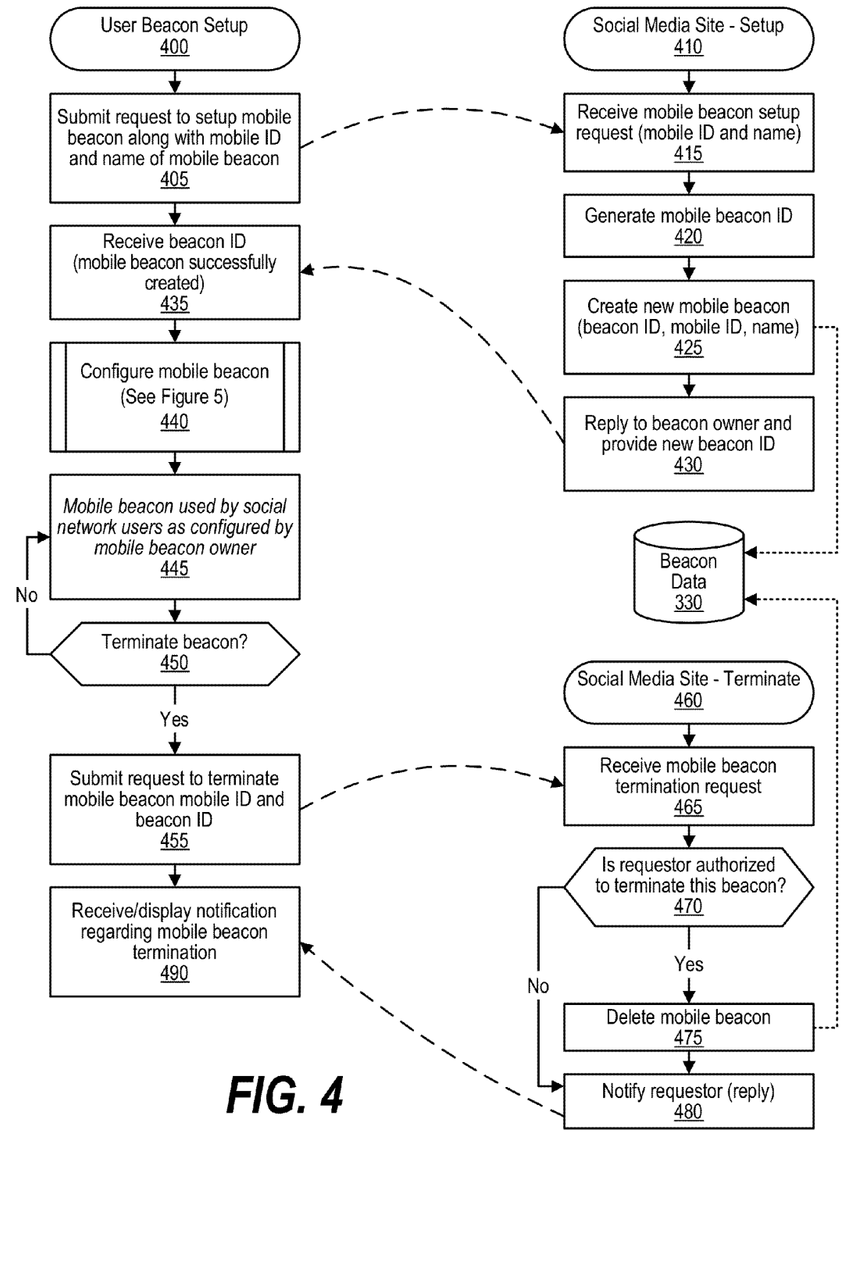
FIG. 4 is a flowchart depicting steps taken by a user and the social media website to setup the mobile location beacon.

FIG. 4 is a flowchart depicting steps taken by a user and the social media website to setup the mobile location beacon. Mobile entity setup performed by the user that establishes a mobile entity commences at 400. At step 405, the user submits a request to establish a mobile entity along with a mobile entity identifier and a name to assign to the mobile entity. The user's information handling system sends the mobile entity identifier and the mobile entity name to the social media website for further processing.

Social media website processing used to setup a mobile entity is shown commencing at 410. At step 415, the social media website receives the mobile entity setup request from the user with the setup request including the mobile entity identifier and the mobile entity name. At step 420, the social media website generates a unique mobile beacon identifier. At step 425, the social media website creates a new mobile entity at the website using the generated beacon identifier, the mobile entity identifier, and the mobile entity name. The social media website stores the mobile entity data in mobile entity data store 330. At step 430, the social media website replies to the user (now the mobile entity owner) with the new beacon identifier established at the social media website.

Returning to user (now owner) processing, at step 435, the beacon owner receives the beacon identifier generated by the social media website when the mobile entity was established. At predefined process 440, the beacon owner configures the new mobile beacon (see FIG. 5 and corresponding text for processing details). At step 445, use of the configured mobile beacon takes place with various users of the social media website utilizing their mobile user devices to "check-in" at the mobile entity. Step 445 can continue indefinitely until the mobile entity is terminated. A decision is made as to whether the owner of the mobile entity wishes to terminate the mobile entity (decision 450). So long as the owner does not wish to terminate the mobile entity, decision 450 branches to the "no" branch and use of the mobile entity continues.

When the owner of the mobile entity wishes to terminate the mobile entity, then decision 450 branches to the "yes" branch for termination processing. Note that the user could have configured the mobile entity to terminate at a particular date/time so that decision 450 branches to the "yes" branch when the configured date/time is, reached or the owner of the mobile entity may decide at some point to terminate the mobile entity.

At step 455, the owner of the mobile entity submits a request to the social media website to terminate the mobile entity providing the mobile entity identifier and the beacon identifier. Social media website processing to terminate the mobile entity is shown commencing at 460 whereupon, at step 465, the social media website receives the mobile entity termination request. A decision is made by the social media website as to whether the requestor is authorized to terminate the mobile entity (decision 470). If the requestor is authorized to terminate the mobile entity, then decision 470 branches to the "yes" branch whereupon, at step 475, the social media website deletes the mobile entity from beacon data store 330. On the other hand, if the requestor is not authorized to terminate the mobile entity, then decision 470 branches to the "no" branch bypassing step 475. At step 480, the social media website sends a notification to the requestor indicating whether the mobile entity was terminated. Returning to owner processing, at step 490, the owner receives and displays the notification regarding the owner's request to terminate the mobile entity.

Figure 5:
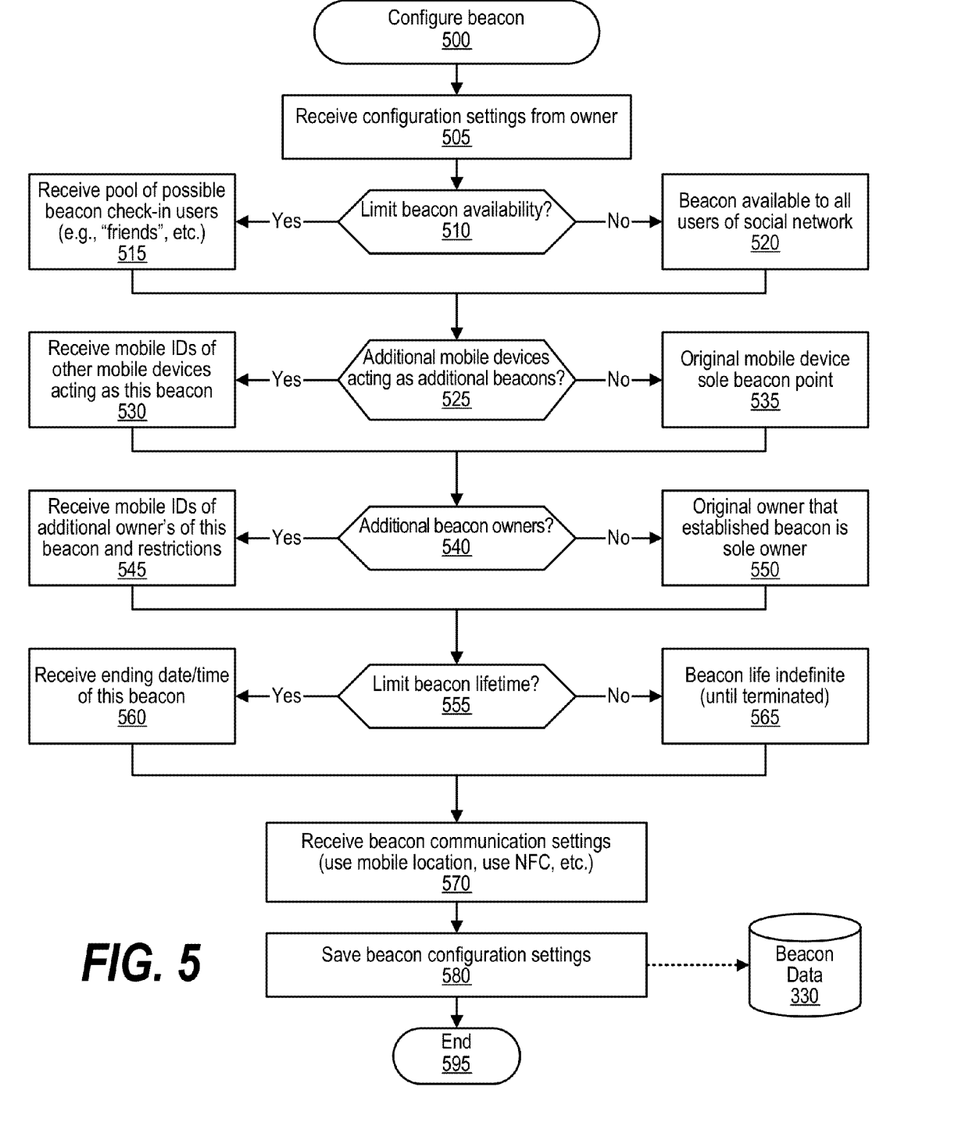
FIG. 5 is a flowchart depicting steps taken to configure a mobile location beacon.

FIG. 5 is a flowchart depicting steps taken to configure a mobile location beacon. Configuration processing commences at 500 whereupon, at step 505, the social media website receives configuration settings from the owner of the mobile entity. A decision is made by the social media website configuration process as to whether access to the mobile entity is limited (decision 510). If access to the mobile entity is limited, then decision 510 branches to the "yes" branch whereupon, at step 515, the social media website receives a list of user identifiers that are authorized to "check-in" to the mobile entity. For example, a mobile entity used at a private party may have a beacon access list that lists those users that have been invited to the private party. On the other hand, if access of the mobile entity is not limited, then the social media website configuration process branches to the "no" branch whereupon, at step 520, the social media website makes the mobile entity available to any of the users of the social media website. For example, a public, traveling performance (e.g., a circus, concert, etc.) may have an open access policy that allows "check-in" to the mobile entity by any user of the social media website.

A decision is made by the social media website configuration process as to whether there are additional mobile entities acting as additional beacons. If additional mobile entities are acting as additional beacons, then decision 525 branches to the "yes" branch whereupon, at step 530, the social media website receives the mobile entity identifiers corresponding to the various additional mobile entities. For example, if a lecture circuit is traveling to a university with various lecturers speaking at the same time at different locations within the university, than each of the lecturers can have a separate mobile entity that allows participants of the lecture to "check-in" to the lecture series regardless of the specific lecture they attend. In another example, an entity, such as a business may be spread over a wide area (e.g., ice cream trucks providing ice cream in various neighborhoods throughout a metropolitan area, etc., a circus that travels to a venue but covers a large geographic area while performing at the venue, etc.). On the other hand, if there are not additional mobile devices that act as additional beacons, then decision 525 branches to the "no" branch whereupon, at step 535, the social media website utilizes a single mobile entity identifier as the beacon of the mobile entity.

A decision is made by the social media website configuration process as to whether there are additional owners of the mobile entity (decision 540). While the mobile entity was established by one owner, additional owners may exist (e.g., partners or joint owners in a business endeavor, etc.). If there are additional owners of the mobile entity, then decision 540 branches to the "yes" branch whereupon, at step 545, the social media website receives the identifiers corresponding to the additional owners of the mobile entity. In addition, the social media website may receive restrictions pertaining to what actions can be taken by the various owners (e.g., which owners can modify the mobile entity configuration, view mobile entity usage data, etc.). On the other hand, if there are no additional owners of the mobile entity, then decision 540 branches to the "no" branch whereupon, at step 550, the original owner that established the mobile entity is the sole owner of the mobile entity.

A decision is made by the social media website configuration process as to whether the mobile entity has a limited lifetime or continues indefinitely (decision 555). If the mobile entity has a limited lifetime, then decision 555 branches to the "yes" branch whereupon, at step 560, the social media website configuration process receives an ending date/time of the mobile entity so that when the ending date/time is reached the mobile entity will be automatically terminated by the social media website. For example, if a tour guide is conducting a history tour within a city, then the tour guide can establish a lifetime of a mobile entity (such as the tour guide's smartphone) so that users can check-in to the mobile entity while the tour is taking place, but the mobile entity terminates when the tour is over. On the other hand, if the mobile entity has an indefinite lifetime, then decision 555 branches to the "no" branch whereupon, at step 565, the social media website establishes the mobile entity indefinitely (e.g., until manually terminated by the owner).

At step 570, the social media website receives mobile entity communication settings from the owner establishing the mobile entity (e.g., whether near field communications (NFC) are used by the mobile entity, whether to transmit the mobile entity's mobile location, etc.). At step 580, the social media website saves the mobile entity configuration settings in beacon data store 330. Configuration processing performed by the social media website thereafter ends at 595.

Figure 6:
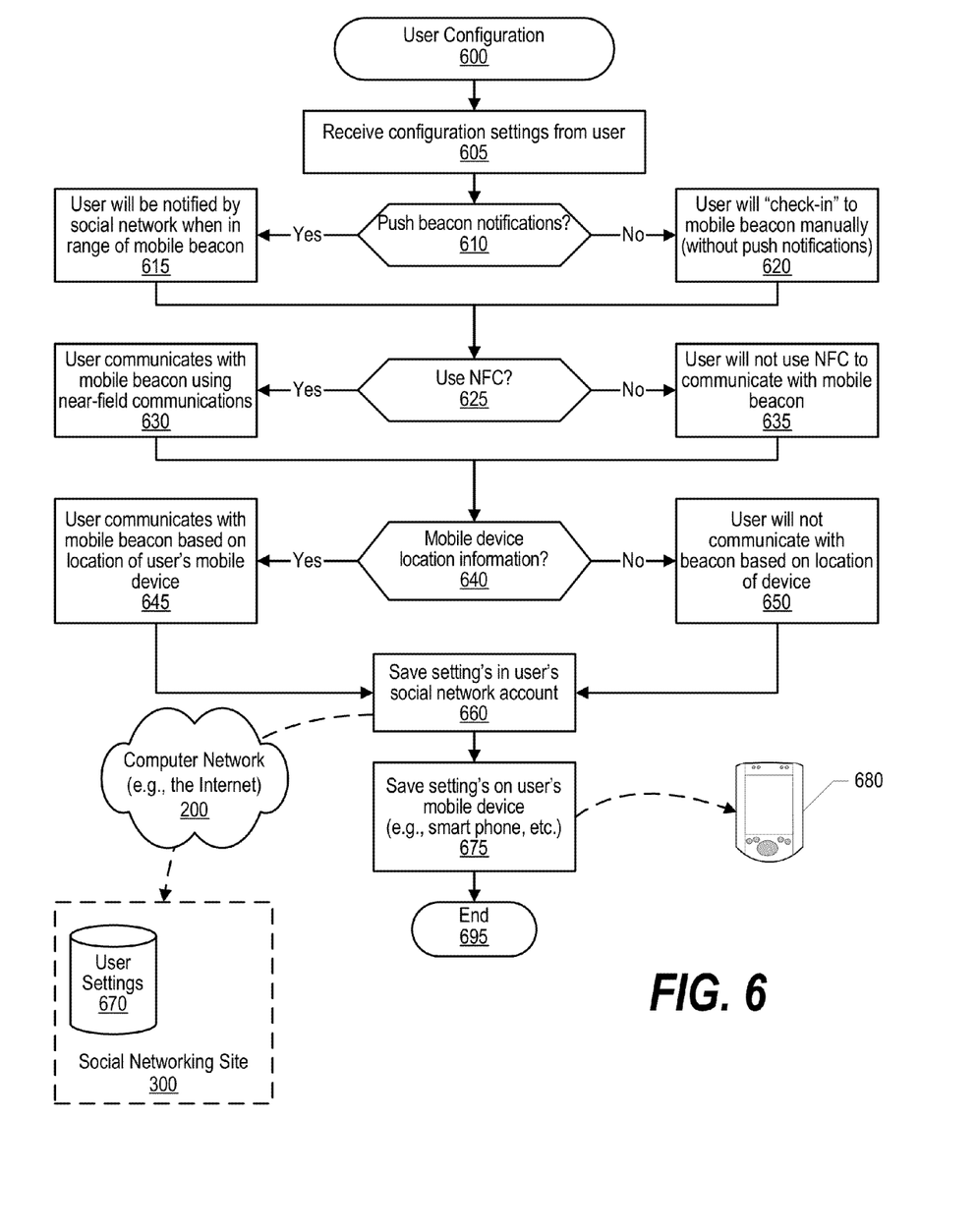
FIG. 6 is a flowchart depicting steps taken by a user to configure usage of mobile location beacons.

FIG. 6 is a flowchart depicting steps taken by a user to configure usage of mobile location beacons. User configuration processing commences at 600 whereupon, at step 605, the process receives various configuration settings from the user (e.g., using a dialog or other input mechanism, etc.). A decision is made as to whether the user wishes to receive "push" notifications from a mobile entity (decision 610). When push notifications are used, the user's device receives a notification from a mobile entity when the user's mobile device is in proximity to the mobile entity. If the user wishes to use push notifications, then decision 610 branches to the "yes" branch whereupon, at step 615, the configuration process sets a setting whereby the user's device receives notifications from mobile entities when the user's device is proximate to the various mobile entities. On the other hand, if the user does not wish to receive push notifications, then decision 610 branches to the "no" branch whereupon, at step 620, the configuration process disables push notifications so that the user manually "checks in" at mobile entities when the user's device is proximate to the mobile entities.

A decision is made as to whether the user wishes to use near field communication (NFC) technology to communicate with mobile entities (decision 625). NFC allows the user's device and the mobile entity to communicate directly with each other. If the user wishes to use NFC, and the user's device supports NFC, then decision 625 branches to the "yes" branch whereupon, at step 630, the configuration process sets a setting whereby the user's device communicates with mobile entities using NFC. On the other hand, if the user does not wish to use NFC, or the user's device does not support NFC, then decision 625 branches to the "no" branch whereupon, at step 635, the configuration process disables use of NFC when communicating with mobile entities.

A decision is made as to whether the user wishes to use mobile device location information, such as gathered using GPS or using triangulation, when communicating with mobile entities (decision 640). Mobile device location information allows verification of the user's mobile device being geographically proximate to a particular mobile entity. If the user wishes to use mobile device location information, then decision 640 branches to the "yes" branch whereupon, at step 645, the configuration process sets a setting allowing the transmission of mobile device geographic data. On the other hand, if the user does not wish to communicate using the user's mobile device location information, then decision 640 branches to the "no" branch whereupon, at step 650, the configuration process disables use of the geographic location data associated with the user's mobile device.

At step 660, the configuration process saves the various user configuration settings in user settings data store 670. In one embodiment, the user settings data store is maintained at social media website 300. In another embodiment, the user settings data store is maintained at a storage area within the user's mobile device. In alternate embodiments, some of the data is stored at the social media website, while other data is stored at the user's mobile device. At step 675, the configuration process saves the configuration settings in the storage area located in the user's mobile device. Processing thereafter ends at 695.

Figure 7:
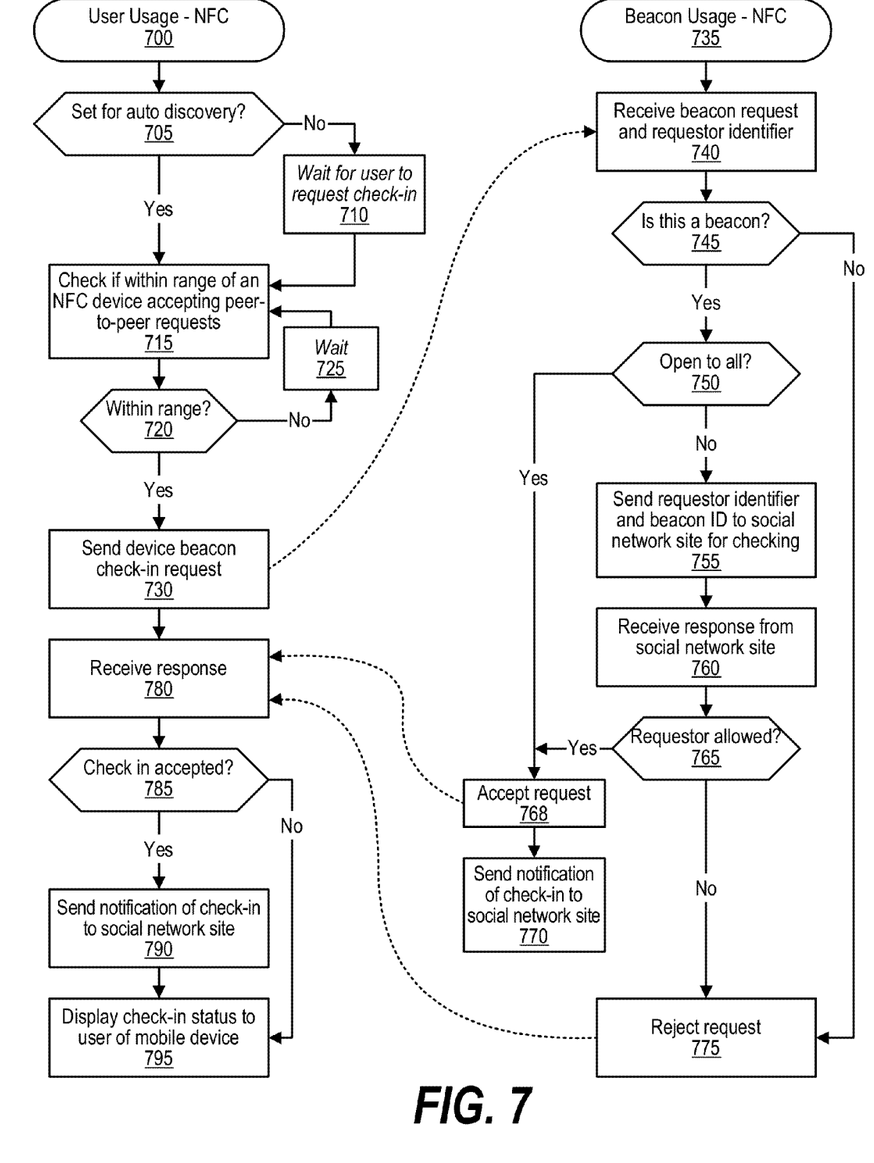
FIG. 7 is a flowchart depicting steps taken to provide mobile location beacon functionality using near field communication (NFC)

FIG. 7 is a flowchart depicting steps taken to provide mobile location beacon functionality using near field communication (NFC). Processing commences at 700 whereupon, the user device with NFC functionality determines whether the user has configured the device to accept "push" notifications that inform the user's device when it is within range (proximate) of a mobile entity (decision 705). If the user's device is not configured to accept "push" type notifications, then decision 705 branches to the "no" branch whereupon, at step 710, the device waits until the user manually requests to check-in at a mobile entity. On the other hand, if the user has configured the device to accept push notifications, then decision 705 branches to the "yes" branch bypassing step 710.

At step 715, the user device checks as to whether the device is within range (proximate) of a mobile entity that is equipped with NFC functionality and is configured to accept peer-to-peer requests from mobile devices (decision 720). If the user device is not within range (proximate) of a mobile entity equipped with NFC functionality and accepting peer-to-peer requests, then decision 720 branches to the "no" branch whereupon, at step 725, the user device waits for a period of time (e.g., one minute, etc.) before looping back to check if the user device is within range of a mobile entity equipped with NFC functionality that is accepting peer-to-peer requests. This looping continues until the user device is within range (proximate) of a mobile entity equipped with NFC functionality and accepting peer-to-peer requests, whereupon decision 720 branches to the "yes" branch and, at step 730, the user device sends the mobile entity a check-in request using NFC.

Mobile entity processing is shown commencing at 735 whereupon, at step 740, the mobile entity receives the check-in request from the user device with the mobile entity's NFC receiver. A decision is made as to whether the mobile entity that receives the request has been configured as a beacon that accepts mobile check-in requests (decision 745). If the receiving device is not configured to act as a mobile entity (beacon), then decision 745 branches to the "no" branch bypassing the remaining steps and the device rejects the request at step 775. On the other hand, if the device is configured to act as a mobile entity, then decision 745 branches to the "yes" for further processing by the mobile entity.

The mobile entity determines whether the mobile entity is open for check-ins by anyone or if there is a beacon access list that controls who can check-in at the mobile entity (decision 750). If the mobile entity is not open to anyone, then decision 750 branches to the "yes" branch for mobile entity access processing. At step 755, the mobile entity sends the mobile user identifier of the requesting user to the social network website for checking. At step 760, the mobile entity receives a response from the social network website regarding whether the requestor is on the beacon access list for the mobile entity. In one embodiment, the beacon access list is maintained on the mobile entity so that, at step 755, the mobile entity checks its internally stored beacon access list rather than sending a request to the social network website. A decision is made as to whether the requesting user is allowed to check-in at this mobile entity (decision 765). If either the requestor is allowed to check-in at this mobile entity (with decision 765 branching to the "yes" branch) or if the mobile entity is open for check-ins by anyone (with decision 750 branching to the "yes" branch), then, at step 768, the mobile entity sends a check-in acceptance response to the requesting user device and, at step 770, the mobile entity sends a notification to the social network website that the requesting user has successfully checked in at the mobile entity (e.g., sending the social network website the identifier of the mobile entity as well as the identifier of the user device, etc.). On the other hand, if the requesting user is not authorized to check in at this mobile entity, then decision 765 branches to the "no" branch whereupon, at step 775, the mobile entity rejects the check-in request and sends the requesting user device a rejection response.

Returning to processing performed by the user device, at step 780, the user device receives a response from the mobile entity. A decision is made as to whether the mobile entity accepted the check-in request (decision 785). If the check-in request was accepted, then decision 785 branches to the "yes" branch whereupon, at step 790, the user device sends a check-in notification to the social network website. On the other hand, if the check-in was not accepted by the mobile entity, then decision 785 branches to the "no" branch bypassing step 790. At step 795, a check-in message is displayed to the user of the mobile user device indicating whether the user successfully checked-in to the mobile entity.

Figure 8:
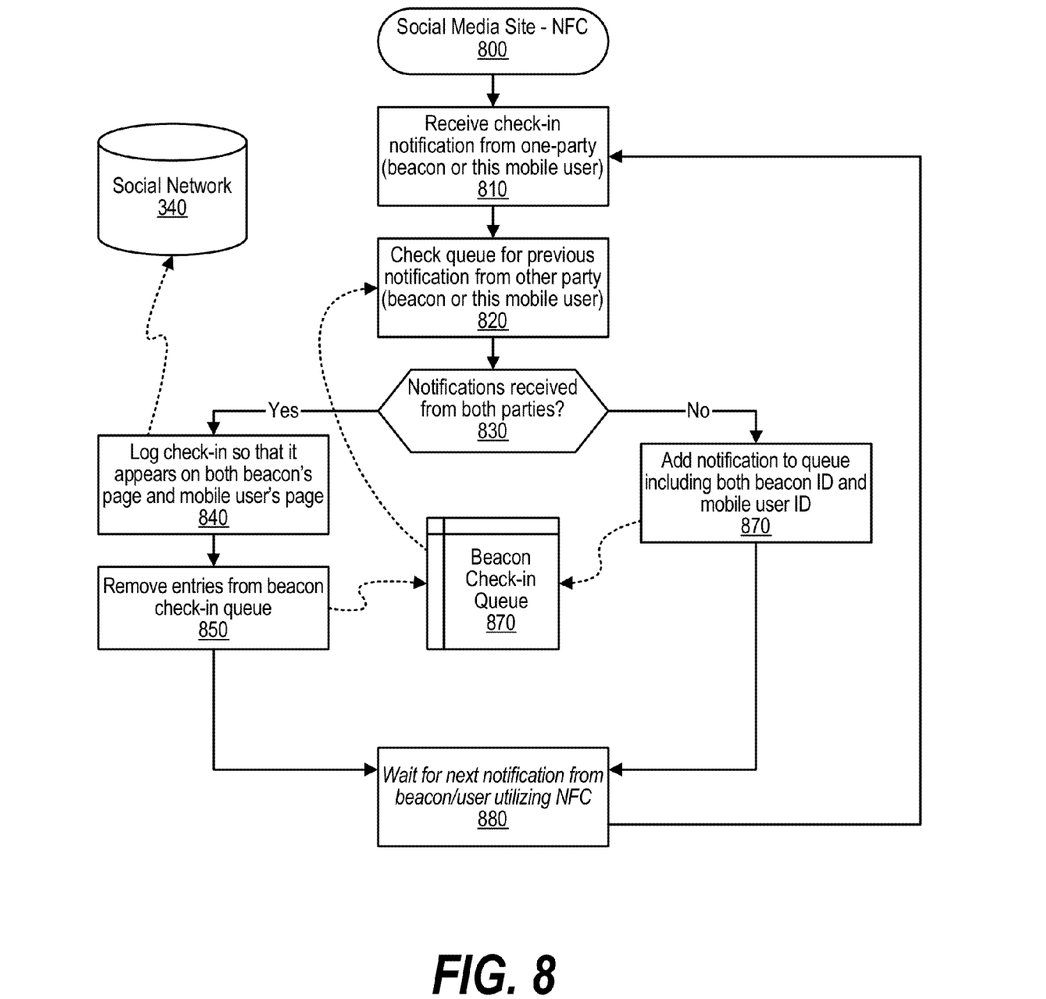
FIG. 8 is a flowchart showing steps performed at the social media website to handle NFC check-ins.

FIG. 8 is a flowchart showing steps performed at the social media website to handle NFC check-ins. Processing commences at 800 whereupon, at step 810, the social network website receives a check-in notification from one of the parties (either from the user's mobile device or from the mobile entity device). The check-in request includes the identifier of both parties. At step 820, the social network website checks beacon check-in queue in order to determine whether a check-in request has been received from both parties (decision 830). If a check-in notification has been received from both parties, then decision 830 branches to the "yes" branch whereupon, at step 840, the social network website logs the check-in in social network website data store 340 so that the check-in event appears on both the user's page as well as the page corresponding to the mobile entity. At step 850, the social network website cleans up beacon check-in queue 870 by removing the entries corresponding to both the user and the mobile entity. On the other hand, if a notification has not been received from both parties, then decision 830 branches to the "no" branch whereupon, at step 870, the social network website adds the received notification (from either the user or the mobile entity) to beacon check-in queue 870 and processing will wait and see if a corresponding check-in is received from the other party at a later time. At step 880, the social network website waits for the next notification to be received from a mobile entity or from a user device. When the next notification is received, processing loops back to step 810 to process the next notification as described above.

In one embodiment, beacon check-in queue 870 is periodically cleaned out so that orphaned entries are removed. For example, if the user device sends a check-in notification, but the user is not authorized to check-in at the mobile entity, then a corresponding check-in notification will not be received from the mobile entity. In this example, the social media website removes the orphaned user check-in notification after some period of time has elapsed (e.g., after five minutes, etc.).

Figure 9:
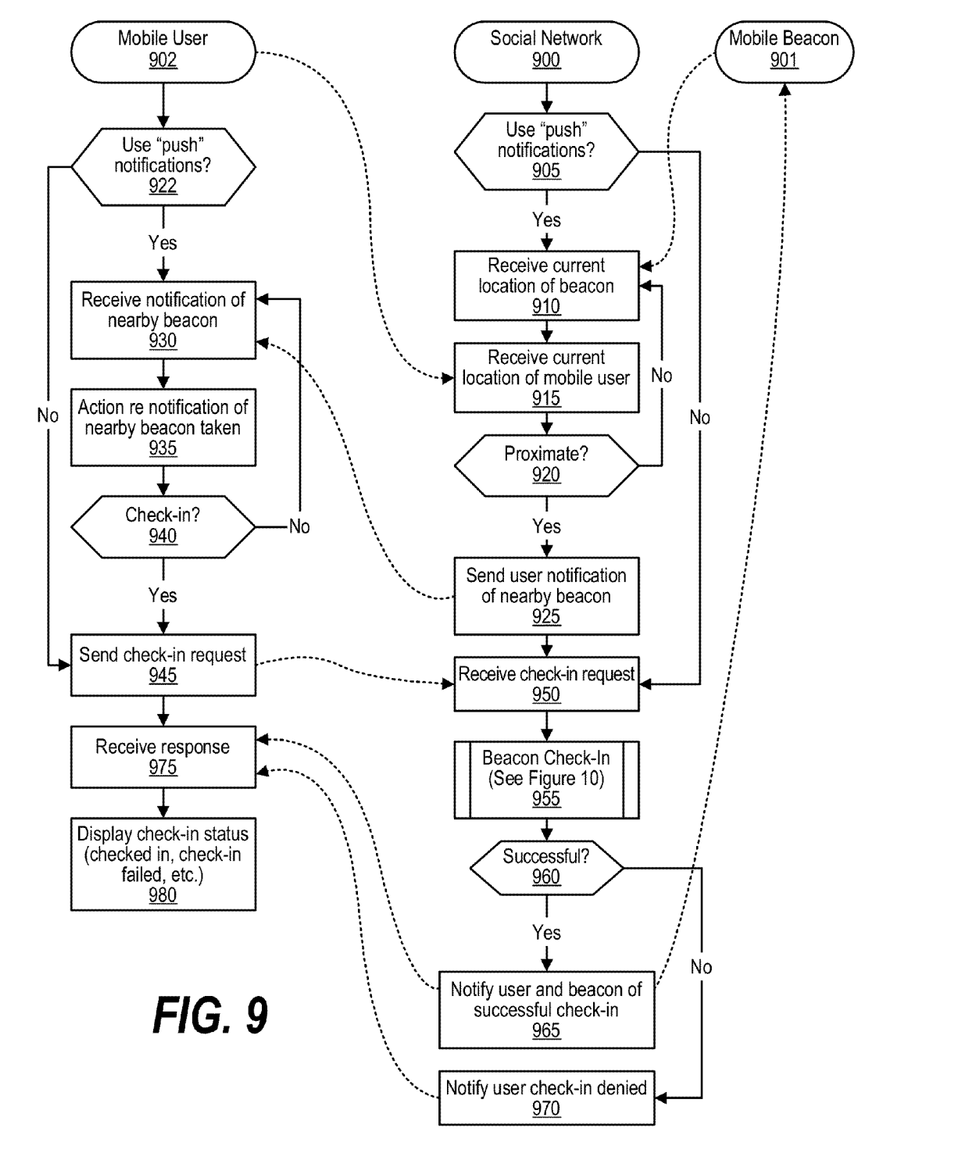
FIG. 9 is a flowchart showing steps taken to provide mobile location beacon functionality using triangulation or GPS technologies.

FIG. 9 is a flowchart showing steps taken to provide mobile location beacon functionality using triangulation or GPS technologies. Social network website processing commences at 900 whereupon the social network website decides whether "push" notifications are being used by the user's mobile device (decision 905). If push notifications are beings used by the user's mobile device, then decision 905 branches to the "yes" branch whereupon, at step 910, the social network website receives the geographic beacon location corresponding to mobile entity 901 and, at step 915, the social network website receives the geographic user location of user's mobile device 902. The social network website decides whether the user's mobile device is proximate to the mobile entity based on the received geographic locations (decision 920). If the user's mobile device is not proximate to the mobile entity, then decision 920 branches to the "no" branch which loops back to continue checking the locations of the user's mobile device and the mobile entity. Because both the user's mobile device and the mobile entity are mobile, they may become proximate to each other at some time. When the user's mobile device is proximate to the mobile entity, then decision 920 branches to the "yes" branch for further processing.

At step 925, the social network website sends the user's mobile device a notification that notifies the user of a nearby (proximate) mobile entity, or beacon. Mobile user device processing commences at 902 whereupon the mobile user device determines whether it is accepting push notifications (decision 922). If the user's mobile device is accepting push notifications, then decision 922 branches to the "yes" branch whereupon, at step 930, the user's mobile device receives the push notification from the social network website of a proximate mobile entity (beacon). At step 935, the user takes action regarding the notification of the proximate mobile entity (e.g., requests to check-in to the mobile entity or ignores the notification and does not check in to the mobile entity, etc.). A decision is made as to whether the user elected to check-in to the proximate mobile entity (decision 940). If the user did not elect to check-in to the mobile entity, then decision 940 branches to the "no" branch which loops back to continue receiving notifications of other nearby beacons. On the other hand, if the user elected to check-in (either decision 940 branching to the "yes" branch or if the user is not using push notifications, then decision 922 branching to the "no" branch when a manual check-in request is received from the user), then at step 945, the user's mobile device sends a check-in request to the social network website.

Social network website processing resumes at step 950 when the social network website receives a check-in request from a user's mobile device. At predefined process 955, mobile entity (beacon) check-in processing is performed (see FIG. 10 and corresponding text for processing details). The social network website determines whether the beacon check-in processing was successful (decision 960). If the beacon check-in processing was successful, then decision 960 branches to the "yes" branch whereupon, at step 965, the social network website sends a notification (response) to the user's mobile device and to the mobile entity that indicates that the user has successfully checked-in at the mobile entity. On the other hand, if the mobile entity check-in process was unsuccessful, then decision 960 branches to the "no" branch whereupon, at step 970, the social network website sends a response notifying the user's mobile device that the check-in request was denied.

Returning to user device processing, at step 975, the user's mobile device receives the response (acceptance or denial) from the social network website. At step 980, the user's mobile device displays the check-in status to the user indicating whether the check-in was successful.

Figure 10:
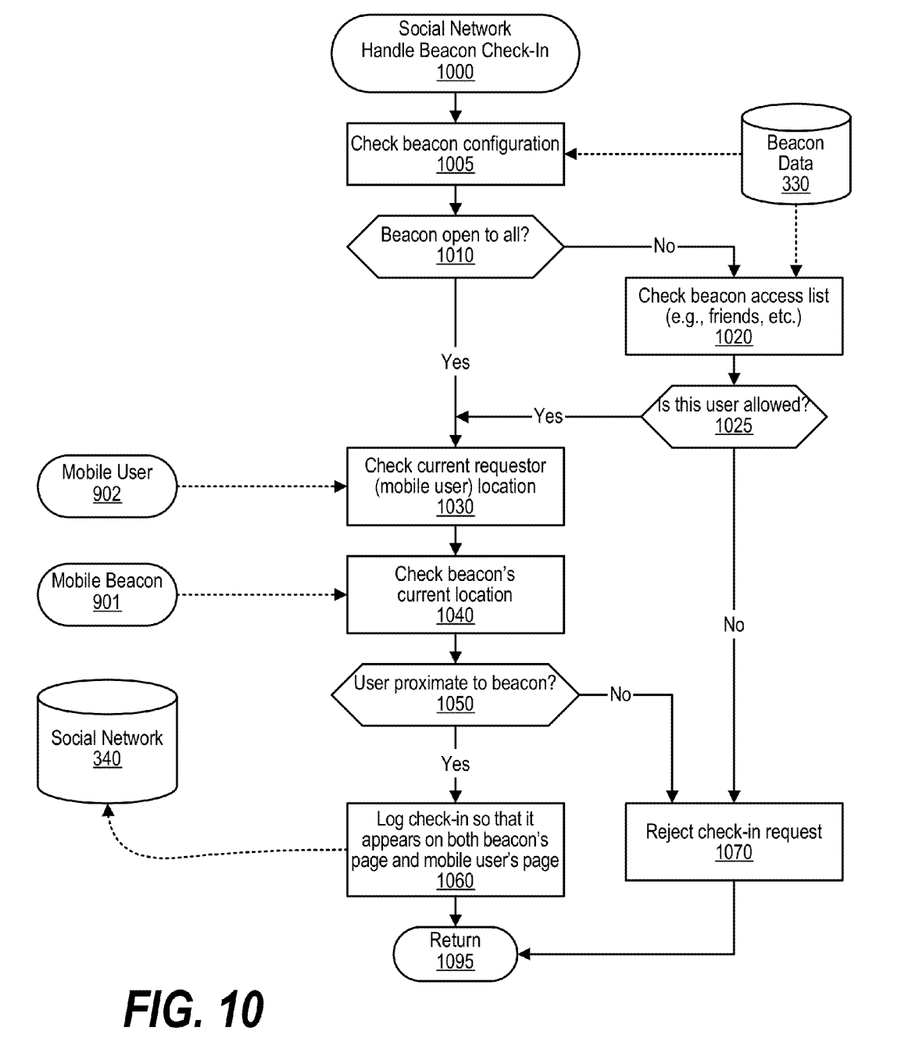
FIG. 10 is a flowchart showing steps taken by the social media website to handle check-ins from the mobile location beacon.

FIG. 10 is a flowchart showing steps taken by the social media website to handle check-ins from the mobile location beacon. Social media website processing commences at 1000 when the routine is called by predefined process 955 shown in FIG. 9. In FIG. 10, at step 1005, the social media website checks the configuration of the mobile entity by retrieving it from mobile entity configuration data store 330. A decision is made as to whether the mobile entity has been configured to accept check-in requests from anyone (decision 1010). If the mobile entity has not been configured to accept check-in requests from anyone, then decision 1010 branches to the "no" branch in order to check the beacon access list pertaining to this mobile entity. At step 1020, the social network website checks the beacon access list pertaining to the user that is requesting to check-in at the mobile entity (decision 1025). If the user is not authorized to check-in at the mobile entity, then decision 1025 branches to the "no" branch whereupon, at step 1070, the social network website rejects the check-in request and processing returns at 1095. On the other hand, if either the mobile entity is open to all users (decision 1010 branching to the "yes" branch) or if the user is authorized to check-in at the mobile entity (decision 1025 branching to the "yes" branch), the social network website processes the check-in request.

In one embodiment, the current geographic locations of the user's mobile device and the mobile entity are checked to ensure they are proximate to each other. In this embodiment, the social network website checks the current geographic location of the check-in requestor (user's mobile device 902) at step 1030. The social network website also checks the current geographic location of the mobile entity (mobile beacon 901) at step 1040. A decision is made by the social network website as to whether the user's mobile device is geographically proximate to the mobile entity (decision 1050). If the user's mobile device is not proximate to the mobile entity, then decision 1050 branches to the "no" branch whereupon, at step 1070, the social network website rejects the check-in request and processing returns at 1095.

On the other hand, if the user's mobile device is proximate to the mobile entity, then decision 1050 branches to the "yes" branch whereupon, at step 1060, the social network website logs the check-in in social network website data store 340 so that the check-in event appears on both the user's page as well as the page corresponding to the mobile entity. Processing then returns to the calling routine at 1095.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, any suitable combination of the foregoing, or a future developed computer readable storage medium. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The connection may be physical or wireless.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method implemented by an information handling system comprising:
    establishing a mobile entity at a social networking website, wherein the mobile entity is associated with an event having a mobile location, and wherein the establishing comprises:
        setting a user access policy that corresponds to the mobile entity;
        establishing one or more mobile entity devices, wherein each mobile entity device serves as a geographic beacon of the mobile entity; and
        setting a mobile entity lifetime that applies to the mobile entity;
    receiving a geographic beacon location corresponding to the mobile entity;
    receiving a geographic user location corresponding to a mobile user device that is associated with a user of the social networking website;
    determining whether the geographic beacon location is proximate to the geographic user location;
    determining whether the user is authorized to check into the mobile entity, wherein the determining comprises:
        sending a user identifier corresponding to the user to the social networking website; and
        receiving a response from the social networking website indicating whether the user is authorized to check into the mobile entity; and
    logging, at the social networking website, a check-in of the user at the mobile entity in response to the determination being that the geographic beacon location is proximate to the geographic user location and the user is authorized to check into the mobile entity.

2. The method of claim 1 wherein the determining whether the user is authorized further comprises:
    retrieving a beacon access list accessible from the social networking website;
    determining whether the user is authorized to check into the mobile entity by comparing the user identifier corresponding to the user with a plurality of authorized user identifiers included in the beacon access list; and
    inhibiting the logging in response to determining that the user is unauthorized to check into the mobile entity.

3. The method of claim 1 wherein the logging further comprises:
    writing the check-in to a user page of the social networking website, wherein the user page corresponds to the user.

4. The method of claim 1 wherein the logging further comprises:
    writing the check-in to a page of the social networking website that corresponds with the mobile entity.

5. The method of claim 1 further comprising:
receiving an entity check-in request from the mobile entity, wherein the entity check-in request includes a mobile user identifier corresponding to the mobile user device, and wherein the entity check-in request is the geographic beacon location;
receiving a user check-in request from the mobile user device, wherein the user check-in request includes a mobile entity identifier corresponding to the mobile entity, and wherein the user check-in request is the geographic beacon location; and
matching the received entity check-in request with the received user check-in request, wherein the determination that the geographic beacon location is proximate to the geographic user location is based upon the matching.

6. The method of claim 5 wherein the mobile entity and the mobile user device communicate with each other using a near field communication (NFC) wireless technology.

7. The method of claim 1 wherein establishing the mobile entity further comprises:
establishing one or more user identifiers as owners of the mobile entity.

8. An information handling system comprising:
one or more processors;
a memory coupled to at least one of the processors;
a network interface that receives signals from a network; and
a set of instructions stored in the memory and executed by at least one of the processors, wherein the set of instructions perform actions of:
establishing a mobile entity at a social networking website, wherein the mobile entity is associated with an event having a mobile location, and wherein the establishing comprises:
setting a user access policy that corresponds to the mobile entity;
establishing one or more mobile entity devices, wherein each mobile entity device serves as a geographic beacon of the mobile entity; and
setting a mobile entity lifetime that applies to the mobile entity;
receiving a geographic beacon location corresponding to the mobile entity;
receiving a geographic user location corresponding to a mobile user device that is associated with a user of the social networking website;
determining whether the geographic beacon location is proximate to the geographic user location;
determining whether the user is authorized to check into the mobile entity, wherein the determining comprises:
sending a user identifier corresponding to the user to the social networking website; and
receiving a response from the social networking website indicating whether the user is authorized to check into the mobile entity; and
logging, at the social networking website, a check-in of the user at the mobile entity in response to the determination being that the geographic beacon location is proximate to the geographic user location and the user is authorized to check into the mobile entity.

9. The information handling system of claim 8 wherein the determining whether the user is authorized comprises further actions of:
retrieving a beacon access list accessible from the social networking website;
determining whether the user is authorized to check into the mobile entity by comparing the user identifier corresponding to the user with a plurality of authorized user identifiers included in the beacon access list; and
inhibiting the logging in response to determining that the user is unauthorized to check into the mobile entity.

10. The information handling system of claim 8 wherein the logging further includes additional actions comprising:
writing the check-in to a user page of the social networking website, wherein the user page corresponds to the user.

11. The information handling system of claim 8 wherein the logging further includes additional actions comprising:
writing the check-in to a page of the social networking website that corresponds with the mobile entity.

12. The information handling system of claim 8 wherein the actions further comprise:
receiving an entity check-in request from the mobile entity, wherein the entity check-in request includes a mobile user identifier corresponding to the mobile user device, and wherein the entity check-in request is the geographic beacon location;
receiving a user check-in request from the mobile user device, wherein the user check-in request includes a mobile entity identifier corresponding to the mobile entity, and wherein the user check-in request is the geographic beacon location; and
matching the received entity check-in request with the received user check-in request, wherein the determination that the geographic beacon location is proximate to the geographic user location is based upon the matching.

13. The information handling system of claim 12 wherein the mobile entity and the mobile user device communicate with each other using a near field communication (NFC) wireless technology.

14. The information handling system of claim 8 wherein establishing the mobile entity comprises further actions of:
establishing one or more user identifiers as owners of the mobile entity.

15. A computer program product stored in a non-transitory computer readable storage medium, comprising functional descriptive material that, when executed by an information handling system, causes the information handling system to perform actions comprising:
establishing a mobile entity at a social networking website, wherein the mobile entity is associated with an event having a mobile location, and wherein the establishing comprises:
setting a user access policy that corresponds to the mobile entity;
establishing one or more mobile entity devices, wherein each mobile entity device serves as a geographic beacon of the mobile entity; and
setting a mobile entity lifetime that applies to the mobile entity;
receiving a geographic beacon location corresponding to the mobile entity;
receiving a geographic user location corresponding to a mobile user device that is associated with a user of the social networking website;
determining whether the geographic beacon location is proximate to the geographic user location;
determining whether the user is authorized to check into the mobile entity, wherein the determining comprises:
sending a user identifier corresponding to the user to the social networking website; and
receiving a response from the social networking website indicating whether the user is authorized to check into the mobile entity; and logging, at the social networking website, a check-in of the user at the mobile entity in response to the determination being that the geographic beacon location is proximate to the geographic user location and the user is authorized to check into the mobile entity.

16. The computer program product of claim 15 wherein determining whether the user is authorized comprises further actions of:
retrieving a beacon access list accessible from the social networking website;
determining whether the user is authorized to check into the mobile entity by comparing the user identifier corresponding to the user with a plurality of authorized user identifiers included in the beacon access list; and
inhibiting the logging in response to determining that the user is unauthorized to check into the mobile entity.

17. The computer program product of claim 15 wherein the logging includes additional actions comprising:
writing the check-in to a user page of the social networking website, wherein the user page corresponds to the user.

18. The computer program product of claim 15 wherein the logging includes additional actions comprising:
writing the check-in to a page of the social networking website that corresponds with the mobile entity.

19. The computer program product of claim 15 wherein the actions further comprise:
receiving an entity check-in request from the mobile entity, wherein the entity check-in request includes a mobile user identifier corresponding to the mobile user device, and wherein the entity check-in request is the geographic beacon location;
receiving a user check-in request from the mobile user device, wherein the user check-in request includes a mobile entity identifier corresponding to the mobile entity, and wherein the user check-in request is the geographic beacon location; and
matching the received entity check-in request with the received user check-in request, wherein the determination that the geographic beacon location is proximate to the geographic user location is based upon the matching.

20. The computer program product of claim 19 wherein the mobile entity and the mobile user device communicate with each other using a near field communication (NFC) wireless technology.

21. The computer program product of claim 15 wherein the actions further comprise:
establishing one or more user identifiers as owners of the mobile entity.

22. A method implemented by a mobile information handling system comprising:
establishing the mobile information handling system at a social networking website, wherein the mobile information handling system is associated with an event having a mobile location, and wherein the establishing comprises:
setting a user access policy that corresponds to the mobile information handling system;
establishing one or more mobile entity devices, wherein each mobile entity device serves as a geographic beacon of the mobile information handling system; and
setting a mobile entity lifetime that applies to the mobile information handling system;
receiving a check-in request from a mobile user device, wherein the check-in request includes a user identifier corresponding to the mobile user device;
determining whether the mobile user device is authorized to check-in at the mobile information handling system wherein the determining comprises:
sending an authorization request to the social media website; and
receiving an authorization response back from the social media website that indicates whether the received user identifier is allowed to check-in at the mobile information handling system
in response to determining that the mobile user device is authorized to check-in, sending a check-in notification from the mobile information handling system to a social media website, wherein the check-in notification includes the user identifier and a mobile entity identifier corresponding to the mobile information handling system.

23. The method of claim 22 wherein the check-in request is received from the mobile user device using a near field communication (NFC) wireless technology.

24. The method of claim 22 wherein determining whether the mobile user device is authorized to check-in further comprises:
comparing the received user identifier with a plurality of authorized user identifiers, wherein the sending of the check-in notification is only performed in response to the received user identifier matching one of the authorized user identifiers.

* * * * *